Jan. 15, 1946. J. P. BELL 2,392,968
MOLD
Filed Aug. 19, 1943 2 Sheets-Sheet 2
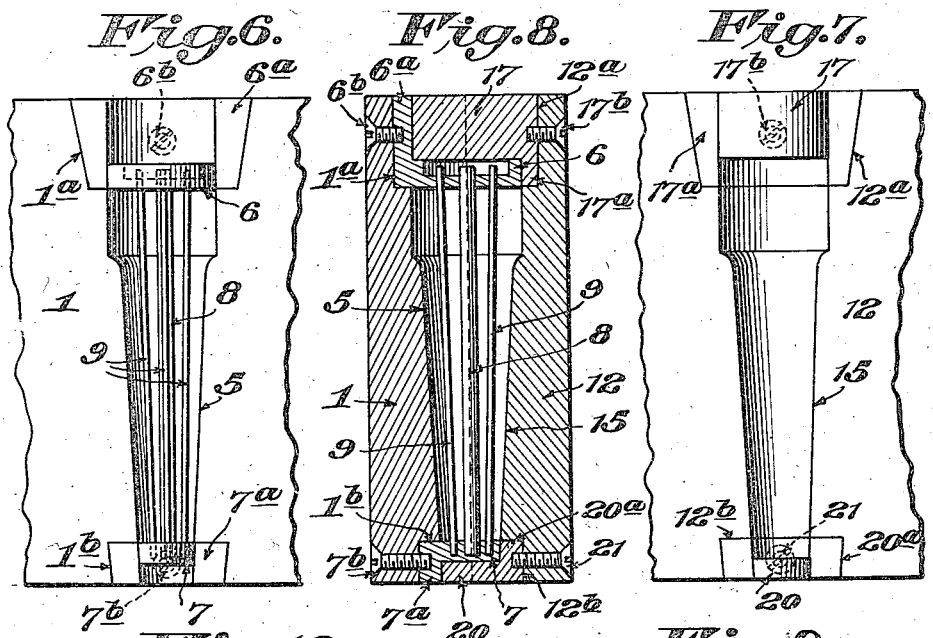
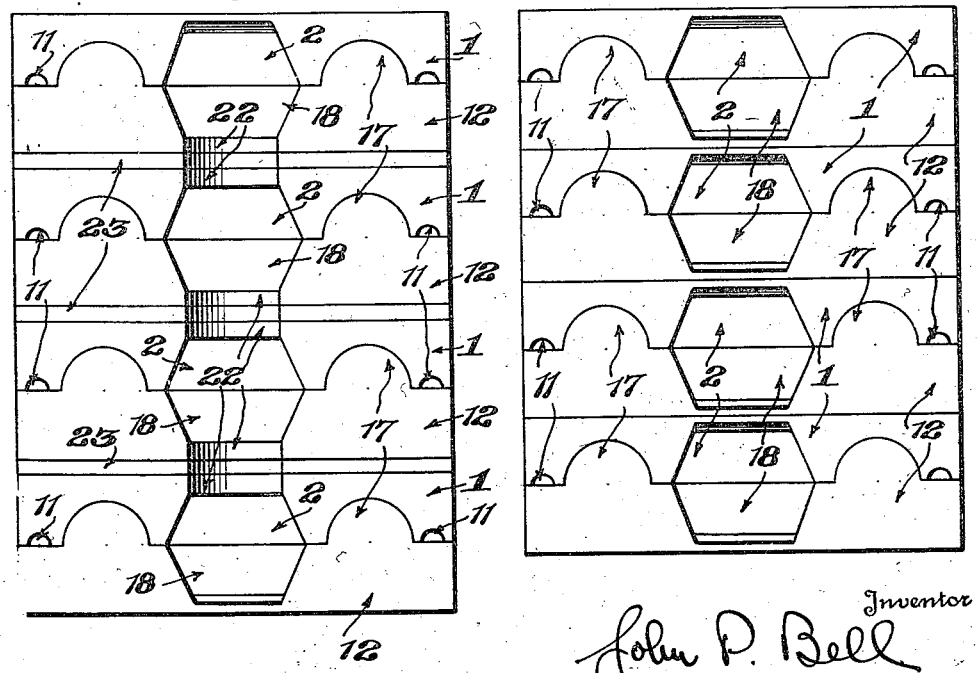
Inventor
John P. Bell
By Alexander H. Bell
Attorneys Patented Jan. 15, 1946

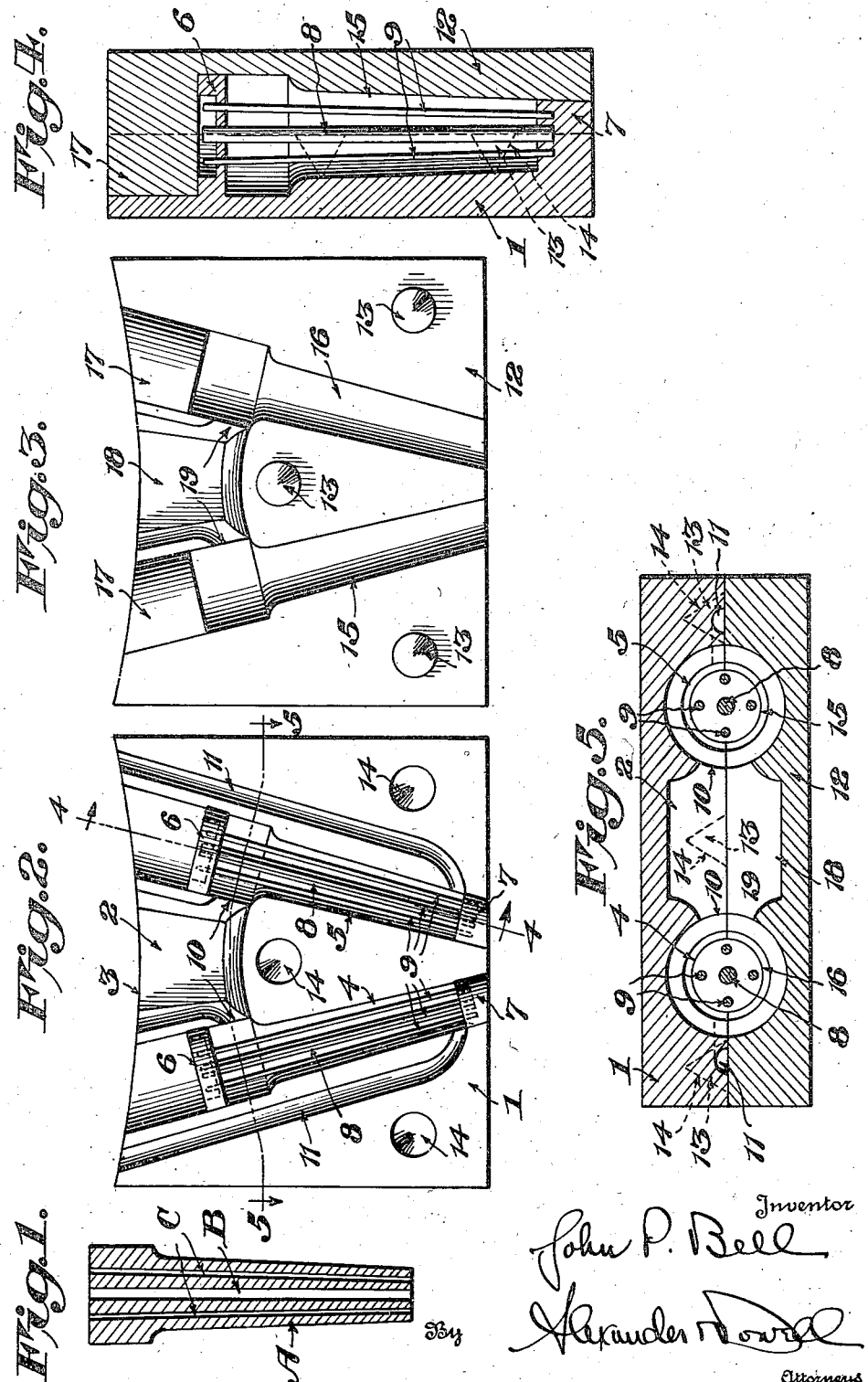

2,392,968

UNITED STATES PATENT OFFICE 2,392,968

MOLD

John P. Bell, Baltimore, Md.

Application August 19, 1943, Serial No. 499,273

2 Claims. (Cl. 22—136)

This invention is a novel mold for casting metallic articles which are relatively long and have bores of relatively small diameter extending therethrough; also a novel method of molding said articles, said method utilizing as cores for forming the relatively small bores, lengths of pencil graphite or similar materials either cylindrical or slightly tapered, and mounted in the mold, which cores will not melt when subjected to the high temperatures of the molten metal, and which cores may be readily withdrawn from or backed out of the molded articles after casting, my method and mold permitting manufacture of the articles in one operation, dispensing with the necessity of having to drill the bores in the articles after the latter have been cast.

More specifically, my invention relates to the molding of acetylene burner or cutting tips usually formed of copper, bronze or any of the high fusing metals, which tips are usually relatively long and of small diameter and are provided with a central oxygen bore surrounded by an annular series of smaller acetylene gas bores extending the length of the tips.

The ordinary practice of molding such burner and cutting tips, involving the operation of drilling the relatively small long bores therein, results in a spoilage of substantially 35% due to breakage of the drills, which being of very small diameter would necessarily be short-lived due to the heat and strains developed in the drilling operation. To overcome this breakage loss, burner or cutter tips have heretofore been provided which were made in connected longitudinal sections so formed as to provide an annular chamber around the central oxygen bore, and the smaller acetylene bores which surround the oxygen bore were formed therein by separately drilling each section from the end into the chamber, thereby reducing the length of the individual bores and drills and thereby effecting some saving in breakage of the drills. Also heretofore burner and cutting tips have been provided in which the tip was cast in one piece, and the oxygen and acetylene bores were formed therein by drilling first from one end to a point approximately half the length of the tip and then reversing the burner tip and drilling from the other end, seeking to have the respective bores register in the finished article. Obviously it was very difficult for the workmen to align the small bores and often the ends of the bores, drilled from opposite ends, would not meet as intended at or adjacent the middle of the burner tip, thus resulting in inferior or worthless tips in which the distribution of acetylene gas would not be balanced around the oxygen core and thereby causing a large percentage of rejects or spoilage.

According to my method, a novel mold is used whereby a plurality of burner or cutter tips may be formed simultaneously, and in which pencil graphite cores may be set in proper position to form the oxygen and acetylene gas bores, the graphite being either cylindrical or slightly tapered, and the mold being made in halves interlocking together and so arranged that after the metal has been poured therein and hardened the halves may be separated and the cast burner or cutting tips removed, and thereafter the graphite cores remaining in the casting may be readily backed out using a small reaming tool, the bores in said casting being thus cast perfectly true in size and diameter throughout the full length of the tip, thereby resulting in a very superior tip in the manufacture of which many costly manual operations are eliminated, and in which spoilage is reduced to an absolute minimum.

Another object of the invention is to provide a novel mold for producing the burner tips having means therein for accurately placing and holding the series of pencil graphite cores prior to pouring the metal thereinto.

Other minor objects of the invention will be hereinafter set forth.

I will explain the invention with reference to the accompanying drawings, which illustrate several practical embodiments thereof, to enable others familiar with the art to adopt and use the same; and will summarize in the claims, the novel features of construction, and novel combinations of parts, for which protection is desired.

In said drawings:

Fig. 1 is a longitudinal section through a conventional burner tip.

Fig. 2 is a plan view of one section of one form of my novel mold for simultaneously molding two burner tips, showing the graphite cores disposed therein prior to the molding operation.

Fig. 3 is a plan view of the complementary mold section which forms with the section shown in Fig. 2 a complete mold.

Fig. 4 is a vertical section along the axis of one of the tip forming cavities of the mold when the mold sections are positioned for the casting operation.

Fig. 5 is a horizontal section through the filling opening of the mold, taken along the line 5—5, Fig. 2.

Fig. 6 is a view similar to Fig. 2 but showing a modified arrangement in which the upper and lower heads of one mold section which hold the graphite cores in place in the mold cavity are removable, to facilitate manufacture of the mold and removal of the castings therefrom.

Fig. 7 is a view similar to Fig. 3 but showing a modification in which the upper and lower dams of the mold cavities are made removable to facilitate manufacture of the mold and removal of the castings therefrom.

Fig. 8 is a vertical section along the axis of the mold cavity, and the mold sections shown in Figs. 6 and 7 are positioned for the casting operation.

Fig. 9 is a plan view showing a plurality of molds placed face to face in position for receiving the molten metal.

Fig. 10 is a plan view similar to Fig. 9 but showing a modified arrangement of the molds whereby the molds are placed face to face with separator strips therebetween and in which a continuous molten metal gutter is formed in the top surface of such assembly.

As shown in Fig. 1, the ordinary burner or cutting tip A is relatively long and of small diameter, and is provided at its axis with a continuous bore B extending therethrough adapted to be supplied through suitable valve controlled means with a supply of oxygen under pressure. Around the central or axial bore B is a series of smaller bores C extending the length of the tip and adapted to be supplied through suitable valve controlled means with acetylene or other gas under pressure. Bores C are ordinarily formed in the cast tip by drilling first from one end of the tip to approximately half the length thereof, and then reversing the tip and drilling from the other end, it being intended that said respective drillings will meet at approximately the center of the tip. Such drilling operations are not only expensive due to breakage of the relatively small long drills, but improper alignment of the respective drilling operations results in spoilage which in the average plant runs as high as 35%. This spoilage greatly increases the cost of the finished product and is wasteful of material and time.

According to my invention I cast the burner tips with finished bores extending therethrough, the same being cast in molds such as shown in Figs. 2 to 10 inclusive. In the form shown in Figs. 2 to 5 each mold is formed in two sections, one section 1 comprises having a recess 2 at its upper edge, the upper face 3 of the plate being dished or trough-shaped as shown in Fig. 2. In section 1, are two diverging core cavities 4 and 5 each approximately semicircular in cross-section and narrowing in radius from the upper to the lower end to form the substantially tapered tip A (Fig. 1).

Adjacent the upper and lower ends of the core cavities 4 and 5 are heads 6 and 7 which are of circular contour and are provided with holes or other means to receive and properly space therein a relatively large pencil graphite core 8 forming the axially disposed oxygen bore B in the cast tip, said bore extending from end to end of the tip. If desired the core 8 may be cylindrical or may be slightly tapered to facilitate removal from the cast article.

Around the axial core 8 are a series of smaller pencil graphite cores 9 which may be cylindrical or slightly tapered and which have their ends held in positioning holes or other means in the heads 6 and 7 similarly to core 8, said cores 9 being adapted to form in the cast tip the acetylene bores C (Fig. 1) thereof. Preferably the positioning holes for the cores 8 and 9 in the upper heads 6 pass entirely through same, while the positioned holes for said cores in the lower heads 7 terminate above the bottom edge thereof so as to retain the molten metal in the cavities 4 and 5 while permitting the cores 8 and 9 to extend slightly beyond the ends of the cast burner or cutting tip. The cores 8 and 9 may readily be inserted into the mold cavities by passing same downwardly and endwise through the open holes in the upper heads 6 (Fig. 4).

Preferably the upper heads 6 are provided with recessed portions in their outer faces through which recessed portions the positioning holes extend, and the upper ends of the bore 9 and 8 extend through the positioning holes and terminate within the recesses, the cores being retained in the heads by the overlying drums 17 hereinafter described.

Cut outs 10 at the bottom of the filling opening 2 establish communication with the core cavities 4 and 5 adjacent their upper ends, as shown in Fig. 2, and overflow ducts 11 are formed in the section 1 beside the cavities 4 and 5 from the bottom of the cavities 4 and 5 to the upper edge of the section. Since the upper core holding heads 6 are disposed below the upper edge of the mold section (Fig. 2) it is obvious that the entire mold may be filled with metal, the section being first fluxed to prevent sticking of the metal thereto, and the metal will fill all parts of the mold cavities 4 and 5 to supply the necessary amount of metal to form the burner tip.

The other mold section 12 shown in Fig. 3 is complementary to the section shown in Fig. 2 and when placed thereon the same is held in relative position by means of conical lugs 13 thereon engaging correspondingly shaped recesses 14 in section 1. The complementary mold section 12 is likewise provided with complemental semi-circular core cavities 15 and 16 adapted to form with the cavities 4 and 5 of the section 1 a substantially cylindrical mold cavity contracting in diameter towards one end. At the upper end of the complementary cavities 15 and 16 are dams 17 adapted when the sections are fitted together to cover the upper core holding heads 6 (Fig. 4) of the section 1 so as to exclude metal therefrom when the sections are assembled and to retain the cores 8 and 9 positioned by the heads 6—7. In the upper end of section 12 is a recess 18 similar to recess 2 of section 1, said recesses 2 and 18 forming the filling opening in the upper end of the mold, recess 18 having cut-outs 19 therein opposite the cut-outs 10 of section 1, said cut-outs 10 and 19 establishing communication between the filling opening 2—18 and the cover cavities 4—16 and 5—15.

By this construction when the mold sections 1 and 12 are placed together (Fig. 4) after the pencil graphite cores 8 and 19 have been assembled as shown in Fig. 2, molten metal may be poured into the filling opening 2—18 to a level above the upper core holding heads 6 of the section 1, and when the metal cools the castings A may be readily removed by separating the sections and prying the castings out, breaking the relatively weak graphite cores 8 and 9 loose from the heads 6 and 7; whereupon the cores 8 and 9 may be readily backed out of the castings A using a suitable reaming tool. The burner tips thus cast will have continuous smooth bores B and C therein, thereby obviating the necessity of having to drill the said bores.

In the modification shown in Fig. 6, each upper core holding head 6 of section 1 is of same general shape as in Fig. 2, but the head 6 is formed separately from section 1 on a block 6a and inserted into a correspondingly shaped recess 1a at the upper end of the mold cavity 4 or 5 of section 1, the inset being retained therein by means of a screw 6b tapped through the wall of section 1 opposite the recess 1a and into the block 6a as shown in Figs. 6 and 8.

The lower core holding head 7 is similarly separably formed on a block 7a which is similarly held in a correspondingly shaped recess 1b at the lower end of the cavity 4 or 5 and held therein by a screw 7b. By forming the heads 6 and 7 separately and inserting same into the recesses 1a, 1b, as aforesaid, a considerable saving in material in the manufacture of section 1 of the core can be effected, and moreover a considerable amount of milling or other work in shaping the section is effected since the major portions of the section have substantially the same thickness throughout.

Fig. 7 shows a modification of Fig. 3 in which the upper dams 17 at the upper end of the cavities 15 and 16 of section 12 are similarly separately formed on blocks 17a which are fitted into correspondingly shaped recesses 12a formed in the section 12 and held therein by means of screws 17b. Similarly the lower dams 20 of the section 12 are mounted on blocks 20a fitted into recesses 12b at the lower ends of the cavities 15 and 16 of section 12, and held therein by screws 21. The lower dams however may be omitted by following the arrangement of the lower head 7 of Fig. 2 in which construction the lower head 7 itself forms the lowered dam of the cavities.

Fig. 9 shows the arrangement of a plurality of molds 1—12 for simultaneously forming a number of burner or cutting tips. In this modification the assembled molds are placed face to face and as the upper face of each mold is concave, in pouring the molten metal it is only necessary for the foundrymen to hold the ladle over the core-filling cavity 2—18 of each mold until each mold is filled with the desired amount, and then to quickly pass the ladle over to the adjacent mold. Since the upper face of the assembled molds is trough-shaped, practically no waste of molten metal would be occasioned.

In Fig. 10 however a modification is shown in which the intermediate molds 2—12 of the assembly have portions of their outer walls opposite the filling openings 2—18 cut away as at 22 with the exception of the outer ends of the trough formed by the upper face of the assembled molds, such arrangement providing a continuous filling trough extending substantially the full length of the assembly. In this modification it is desirable to place spacing strips 23 between adjacent molds, these strips being of substantial thickness. All portions of the mold would be coated with anti-flux to prevent the molten metal from sticking to the metal mold.

My method is extremely simple in operation and is a decided improvement in the art of molding metal objects having small relatively long bores of small diameter extending therethrough, and results in a minimum spoilage occasioned by breakage of drills and misalignment of bore sections. The molds themselves are simple to construct and to operate, and provide a means whereby a relatively large number of tips or other objects may be cast at one time, requiring a minimum amount of hand work thereupon after casting.

I claim:

1. A stationary mold for casting metallic articles having a bore therein comprising a pair of mold sections adapted to be placed face to face and having opposed complementary cavities in their adjacent faces together forming a mold cavity; space heads and dams carried by the respective sections adjacent opposite ends of the mold cavity, the heads being innermost and defining the length of the mold cavity; one or more pencil graphite cores within the cavity having their ends positioned in the heads; one of the heads having holes extending partly therethrough adapted to receive and support the adjacent ends of the core, the other head having a recess in its outer face and having holes extending through said recessed portion through which the cores are entered into the cavity, said cores extending beyond the said latter holes and terminating within said recess, and the dam adjacent said other head overlying the recess and the adjacent ends of the cores to prevent withdrawal of the cores when positioned in the heads.

2. In a mold as set forth in claim 1, said heads and dams being separable from each section and having base blocks seating in correspondingly shaped depressions in each section, and means for holding the bases in said depressions.

JOHN P. BELL.